US012623520B2

(12) United States Patent
Jansen

(10) Patent No.: US 12,623,520 B2
(45) Date of Patent: May 12, 2026

(54) ROOF SYSTEM FOR A VEHICLE COMPRISING A SUNSHADE ASSEMBLY

(71) Applicant: INALFA ROOF SYSTEMS GROUP B.V., Oostrum (NL)

(72) Inventor: Carolus Theodorus Wilhelmus Jansen, Vieringsbeek (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 345 days.

(21) Appl. No.: 18/259,369

(22) PCT Filed: Dec. 21, 2021

(86) PCT No.: PCT/EP2021/087134
§ 371 (c)(1),
(2) Date: Jun. 26, 2023

(87) PCT Pub. No.: WO2022/144254
PCT Pub. Date: Jul. 7, 2022

(65) Prior Publication Data
US 2024/0059130 A1 Feb. 22, 2024

(30) Foreign Application Priority Data
Dec. 28, 2020 (EP) ..................................... 20217452

(51) Int. Cl.
*B60J 7/00* (2006.01)
*B60J 3/02* (2006.01)

(52) U.S. Cl.
CPC .................................. *B60J 7/0015* (2013.01)

(58) Field of Classification Search
CPC ...... B60J 7/0015; B60J 1/2027; B60J 1/2052;
B60J 1/2058; B60J 1/2013; B60J 1/2016;
B60J 1/2019; B60J 1/2022; B60J 1/2025
(Continued)

(56) References Cited

U.S. PATENT DOCUMENTS 6,015,184 A * 1/2000 Ewing .................... B60J 7/0015
296/214
6,830,291 B2 * 12/2004 Langguth ................... B60J 7/02
384/42
(Continued)

FOREIGN PATENT DOCUMENTS

DE 19834777 A1 2/2000
DE 102007012259 A1 9/2008
(Continued)

OTHER PUBLICATIONS

DE102017218895 TEXT (Year: 2019).*
(Continued)

*Primary Examiner* — Dennis H Pedder
(74) *Attorney, Agent, or Firm* — Steven M. Koehler;
Westman, Champlin & Koehler, P.A.

(57) ABSTRACT

A roof system for a vehicle includes a sunshade assembly, which comprises a flexible sunscreen having opposed longitudinal and transversal edges and a winding shaft carrying a winding roller configured for winding and unwinding the sunscreen. The roller is provided with an internal spring connected between the roller and the shaft and is preloaded to wind the sunscreen thereon. Two drive cables extend along and are capable of a movement parallel to the longitudinal edges of the sunscreen. The cables are connected to opposite ends of an operating beam for moving it to wind and unwind the sunscreen. A rotatable gearwheel is positioned at only one end of and concentrically fixed to the shaft and is drivably in engagement with one of the drive parts, such that a displacement of said one of the drive parts results in a rotation of the shaft in the same direction as the roller.

13 Claims, 11 Drawing Sheets

(58) Field of Classification Search
USPC ........................................................ 296/214
See application file for complete search history.

(56) References Cited

U.S. PATENT DOCUMENTS

| | | | | |
|---|---|---|---|---|
| 8,419,119 | B2 * | 4/2013 | Nakamura | ............. B60J 7/0015 |
| | | | | 160/265 |
| 2002/0053410 | A1 * | 5/2002 | Mayr | .................... E06B 3/6722 |
| | | | | 160/98 |
| 2006/0260770 | A1 * | 11/2006 | Gradl | ..................... B60J 1/2086 |
| | | | | 160/370.22 |
| 2008/0223534 | A1 * | 9/2008 | Hansen | .................. B60J 1/2086 |
| | | | | 160/370.22 |

FOREIGN PATENT DOCUMENTS

| | | | | | |
|---|---|---|---|---|---|
| DE | 102008011505 | A1 | | 9/2009 | |
| DE | 102017218895 | A1 * | 4/2019 | ........... B60J 7/0015 |
| WO | 9601191 | A1 | | 1/1996 | |
| WO | 2011086084 | A1 | | 7/2011 | |
| WO | 2021151654 | A1 | | 8/2021 | |

OTHER PUBLICATIONS

International Search Report and Written Opinion for corresponding International application No. PCT/EP2021/087134 dated Apr. 12, 2022.

* cited by examiner

ROOF SYSTEM FOR A VEHICLE COMPRISING A SUNSHADE ASSEMBLY

CROSS-REFERENCE TO RELATED APPLICATION(S)

The present application is a § 371 national phase entry of International patent application Serial No. PCT/EP2021/087134, filed Dec. 21, 2021, and published in English, and claims priority from European application no. 20217452.0 filed on Dec. 28, 2020.

BACKGROUND

The invention relates to a roof system for a vehicle including a sunshade assembly, which comprises a flexible sunscreen having opposed longitudinal edges and opposed transversal edges; a winding shaft carrying a rotatable winding roller configured for winding and unwinding the sunscreen at a first one of its transversal edges, the winding roller being provided with an internal spring connected between the winding roller and the winding shaft and being preloaded to wind the sunscreen thereon; an operating beam connected to the second one of the transversal edges of the sunscreen; two drive parts extending along and capable of a movement parallel to the longitudinal edges of the sunscreen, wherein the drive parts are driven by a corresponding drive and are connected to opposite ends of the operating beam for moving it to wind and unwind the sunscreen.

In the design and manufacture of vehicle roof assemblies much effort is taken to reduce noises caused by the roof system as a result of operating movements. One of the noise sources is an electric motor drive. In the case of motor driven sunshade assemblies in which a flexible sunscreen is wound onto and off the winding roller the noise made by the electric motor varies as a result of the increasing counterforce by the spring in the winding roller. This spring force increases when the sunscreen is unwound, and the spring is loaded as a result.

Attempts have been made to reduce this increase of the spring counterforce, and one way to accomplish this, is by allowing the motor shaft to move along with the winding roller.

WO 96/01191 discloses a vehicle sunshade assembly in which the winding shaft is provided on both ends with a gearwheel and the driving cables driving the operating beam are extended to engage the gearwheels on the winding shaft. Thus, if the operating beam is driven, the winding roller is rotated by the winding or unwinding sunscreen and the winding shaft is rotated by the gearwheels. If the operating beam is driven with a constant speed, the winding shaft rotates with a constant speed as well, however the rotation of the winding roller increases or decreases due to the sunscreen wound on or off the winding roller which increases or decreases the winding diameter. Thus, if the sunscreen is being unwound from the winding roller, its diameter decreases and therefore the rotational speed of the winding roller increases. This means that the spring force is slightly increased during unwinding, but much less than with a spring that is connected between the winding roller and a stationary part. A slight increase is favorable as a higher force is needed when the sunscreen is fully unwound than when the sunscreen is only slightly unwound.

A disadvantage of this prior art roof system is that the additional gearwheels and extended drive cables increase the cost thereof.

SUMMARY

A roof system comprises a rotatable drive member positioned at only one end of and concentrically fixed to the winding shaft and being drivably in engagement with one of the drive parts, such that a displacement of said one of the drive parts results in a rotation of the winding shaft in the same direction as the winding roller.

Due to the invention, the additional cost is reduced by driving the winding shaft by means of one gearwheel fixed to only one end of the winding shaft. It has been a paradigm in the roof system manufacture that drives in a sunshade assembly must always be symmetrical to avoid the sunscreen being pulled out of alignment. It has been surprisingly found that a one-sided drive for the winding shaft does not cause such problem.

Although a one-sided drive for a winding shaft is known from DE 10 2007 012 259 A1, this sunscreen is intended for a vehicle window where only one guide and therefore only a one-sided drive of the winding shaft is possible. Also, the operating beam is driven by one drive part contrary to the present invention in which the operating beam is driven at both ends and the winding shaft at one end. In the design of roof systems it has always been the belief that the external drive of all parts in the sunshade assembly should be symmetrical with respect to a longitudinal centerline but is has turned out that this is not necessary, at least not for the winding shaft.

In one embodiment, the spring is a torsion spring provided around the winding shaft and fixed with one end to the winding shaft and with the opposite end to the winding roller.

For example, a spring fixator is clamped within the winding roller and is fixed to said opposite end of the torsion spring.

In a convenient embodiment, the drive parts are flexible drive cables having an outer toothing and the drive member being a gearwheel which engages with the toothing on said one of the drive cables.

The drive member may be fixed to an end piece of the winding shaft which is rotatably accommodated within the winding roller. In this respect, the drive member may be integrated with the end piece or may be attached to it, for example by means of a flat key, spine or the like.

The drive member is preferably arranged next to a bearing to rotatably support the winding shaft. As a result, the driving force can be absorbed directly by the bearing.

In a preferred embodiment, the opposed longitudinal edges of the sunscreen are foldable and configured as longitudinal strips, the sunshade assembly further comprising longitudinal guides alongside the edges of the sunscreen and configured to guide the ends of the operating beam and configured to slidably hold the strips at the edges of the sunscreen, which edges are unfolded when the screen is wound up on the winding roller and which are folded into the longitudinal guides when the sunscreen in unwound from the winding roller.

In such embodiment the longitudinal guides may be provided with a folding member for folding and unfolding the sunscreen strips, and wherein said one of the drive cables is guided in a cable guide to said gearwheel, said cable guide being integrated into the folding member. This reduces the number of components for the drive.

The cable guide extends from the corresponding longitudinal guide outwardly to a position engaging the gearwheel.

The cable guide preferably extends from a position engaging the gearwheel longitudinally and then inwardly along a curve, especially if the winding roller is positioned near a front or rear edge of a frame supporting the sunshade assembly.

The cable guide may at least partly be a tube fixed to the frame and/or the cable guide is at least partly a cable guide channel integrated in or connected to the frame which is made at least partly from plastic.

The invention also includes a sunshade assembly which is intended and apparently suited for use in a roof system for a vehicle as defined above.

BRIEF DESCRIPTION OF THE DRAWING

Further details and advantages of the invention will become clearer from the following description of embodiments of the roof system with reference to the drawings.

DETAILED DESCRIPTION

Figure 1:
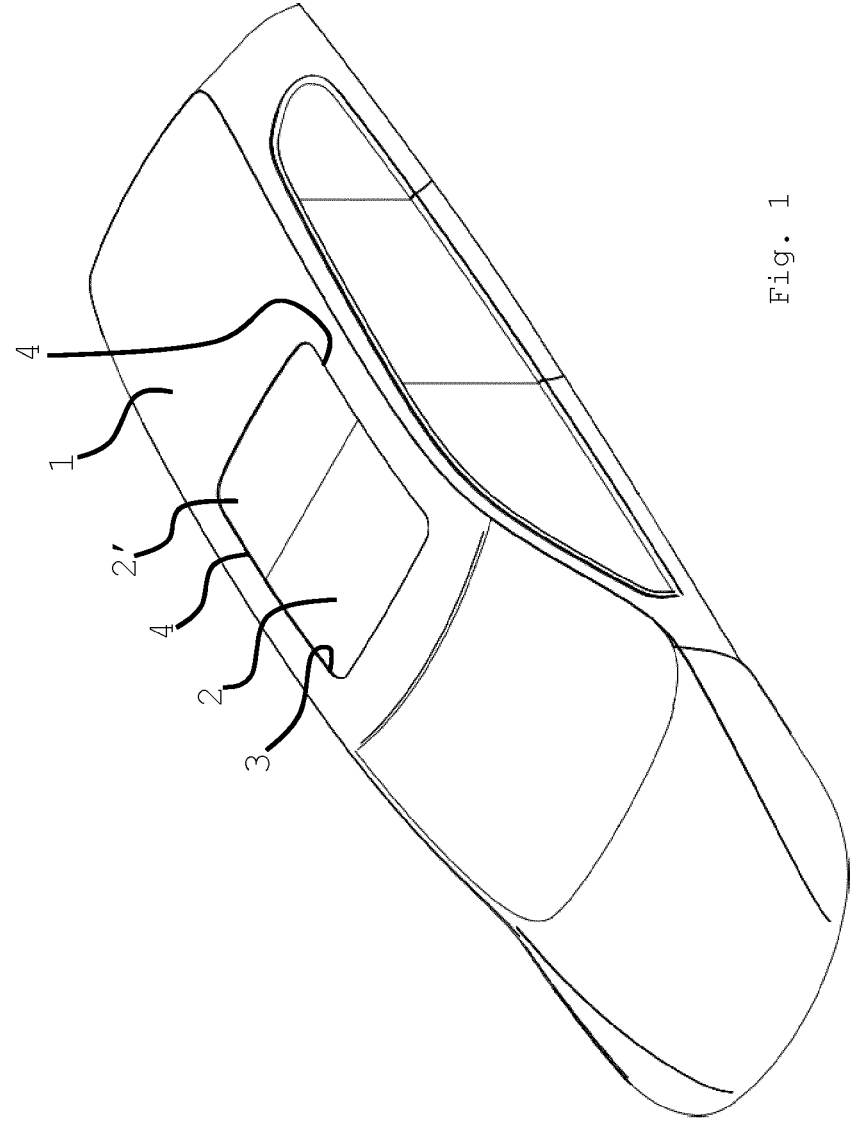
FIG. 1 is perspective view of the upper part of a vehicle comprising a roof system with a sunshade assembly.

FIG. 1 shows a part of vehicle, in this case a passenger car, comprising a roof system in its fixed roof 1. The vehicle may for example also be a truck, camper, caravan or the like. The roof system comprises a transparent or semi-transparent panel 2 (or a panel with variable transparency) which is configured to close or at least partly open a roof opening 3 in fixed roof 1. The roof system further comprises along and below each (left and right) longitudinal edge 4 of roof opening 3 a guide rail 5. The panel 2 is slidably guided in an outer part 6 of guide rail 5 and is also movable in vertical direction in order to enable panel 2 to slide above or below fixed roof 1. Adjacent to, in this case behind, movable semi-transparent panel 2 there is arranged a second panel 2', this panel may be a fixed panel and may be semi-transparent like front panel 2. However it may be conceivable as well that second panel 2' is also a movable panel for instance it may be a tiltable panel. Further it would be possible that the single panel or all panels of the roof system are fixed.

The roof system further comprises a retractable sunshade assembly 1, comprising a flexible cloth-like sunscreen 8 which is retractable, such that in a wound or open mode, light coming from the exterior side of the vehicle may enter an interior space in the vehicle, and daylight is blocked when sunshade assembly 7 is in an extended or unwound mode. The retractable sunscreen 8 is slidably guided in a pair of grooves 9 in guide rails 5.

Figure 2:
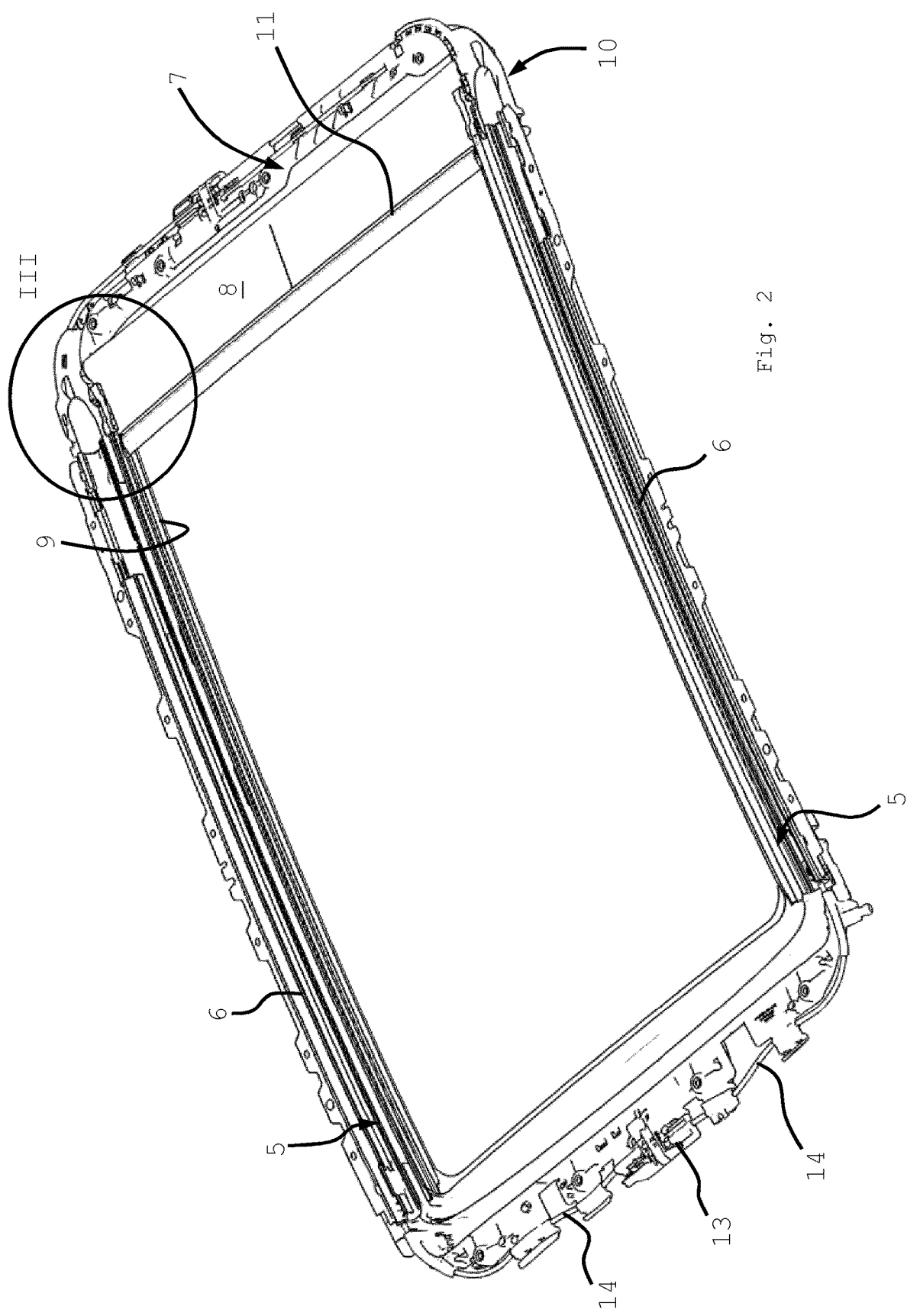
FIG. 2 is an enlarged perspective view of a frame of the roof system of FIG. 1 including the sunshade assembly in the substantially open position.

In FIG. 2 the roof system is shown partly whereby first and second panels 2, 2' are omitted for clarity and only a basic frame 10 of the roof system is shown comprising the longitudinal guide rails 5. The retractable sunscreen 8 is shown as a rollo comprising a flexible cloth and on its free transverse edge an operating beam 11 attached to sunscreen 8.

FIGS. 3-6 show that flexible sunscreen 8 is fixed on its transverse edge opposite operating beam 11 to a winding roller 12, on which sunscreen 8 is wound when the sunscreen 8 is in its open position and from which it is unwound when in its closed position. For winding and unwinding sunscreen 8 operating beam 11 may be moved by hand or in this case by a motorized drive including an electric motor 13 and toothed push and pull drive cables 14 engaged by electric common electric motor 13 and guided within guide rails 5 in order to slide operating beam 11 which is guided with its ends in said grooves 9 of said guide rails 5 as well.

Figure 7:
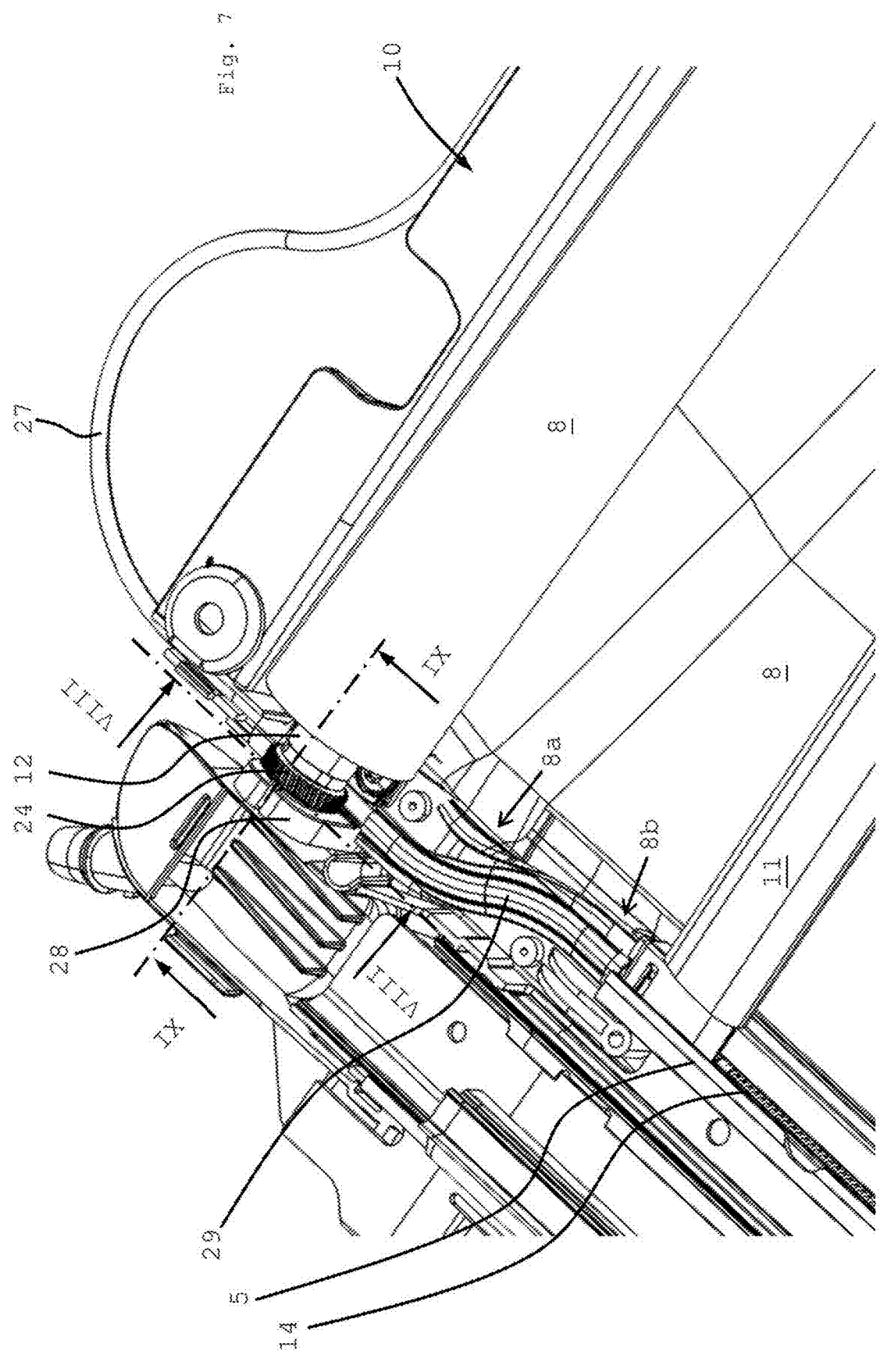
FIG. 7 is a view corresponding to that of FIG. 3 but showing another embodiment.

In order to stretch sunscreen 8 in transverse direction when unwound, the longitudinal sides of sunscreen 8 are held by and guided in said grooves 9 of guide rail 5. For example the longitudinal sides 8a of sunscreen 8 are provided with guide strips 8b (a portion of which is shown in FIG. 7 where longitudinal side 8a is in the process of being folded down to the position of 8b) formed from or attached to the side edges of sunscreen 98. The guide strips 8b are foldable along a longitudinal folding line and are unfolded to a position aligned with sunscreen 8 when this is wound onto winding roller 12 and are folded inwardly when sunscreen 8 is unwound from winding roller 12. This way of guiding the sides Sa of sunscreen 8 is known and for example disclosed in U.S. Pat. No. 9,649,918, the contents of which are incorporated herein by reference thereto. A folding guide 15 is positioned between each guide rail 5 and winding roller 12 to guide the folding/unfolding movement of the respective guide strip 8b of sunscreen 8.

The cloth of sunscreen 8 is stretched in longitudinal direction by means of a spring 16 inside winding roller 12.

Figure 14:
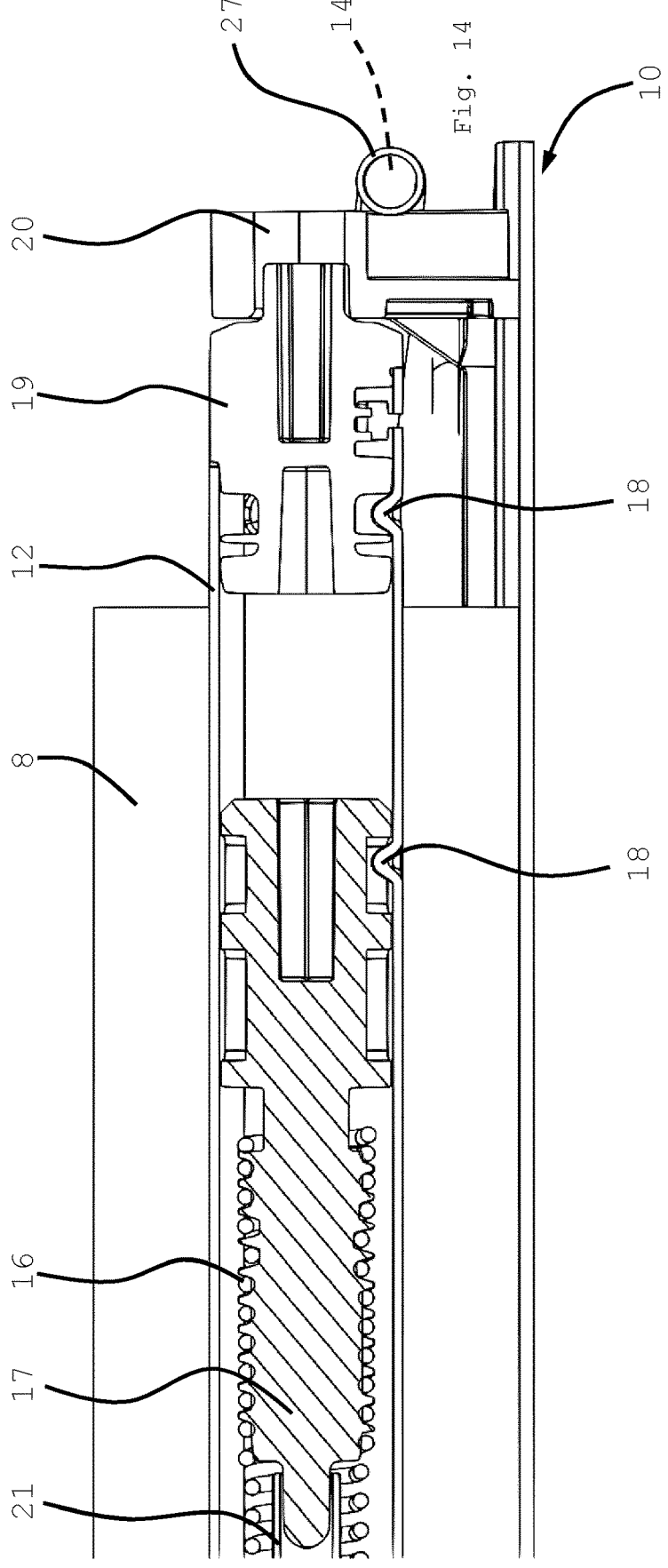
FIG. 14 is a sectional view according to the line XIV-XIV in FIG. 11.

FIG. 14 shows how spring 16 is attached to winding roller 12. A fixator 17 is rotatably fixed within winding roller 12 (for example by one or more indentations 18). This fixator 17 holds one of the ends of spring 16, which is configured as a cylindrically wound or helical torsion spring, in a non-rotatable fashion, such that if winding roller 12 rotates, the fixed end of spring 16 rotates along. FIG. 14 further shows that winding roller has a plastic bearing part 19 rotatably supported by bearing 20 on frame 10.

Figure 4:
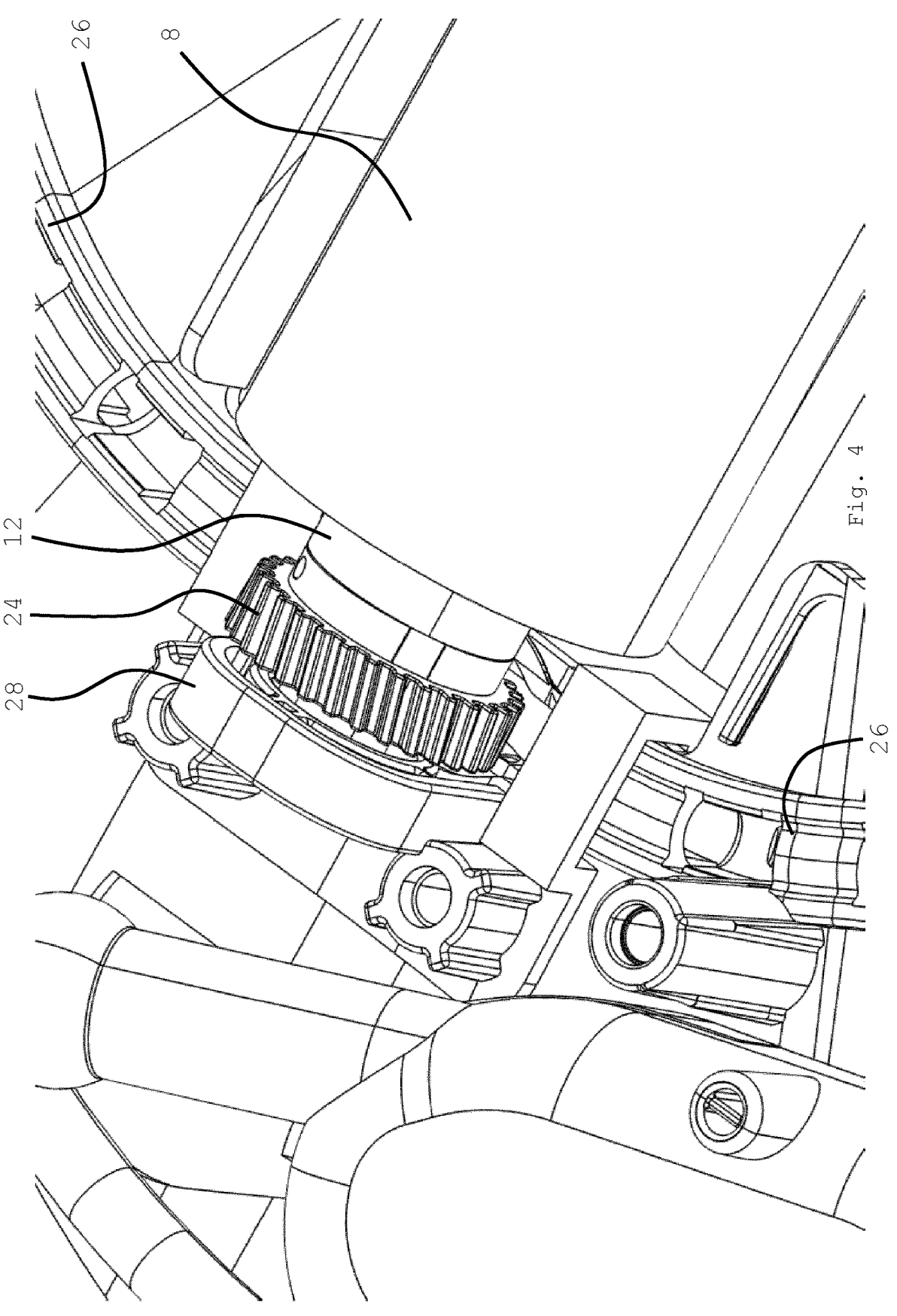
FIG. 4 shows a part of FIG. 3 on an even larger scale.
Figures 5, 6:
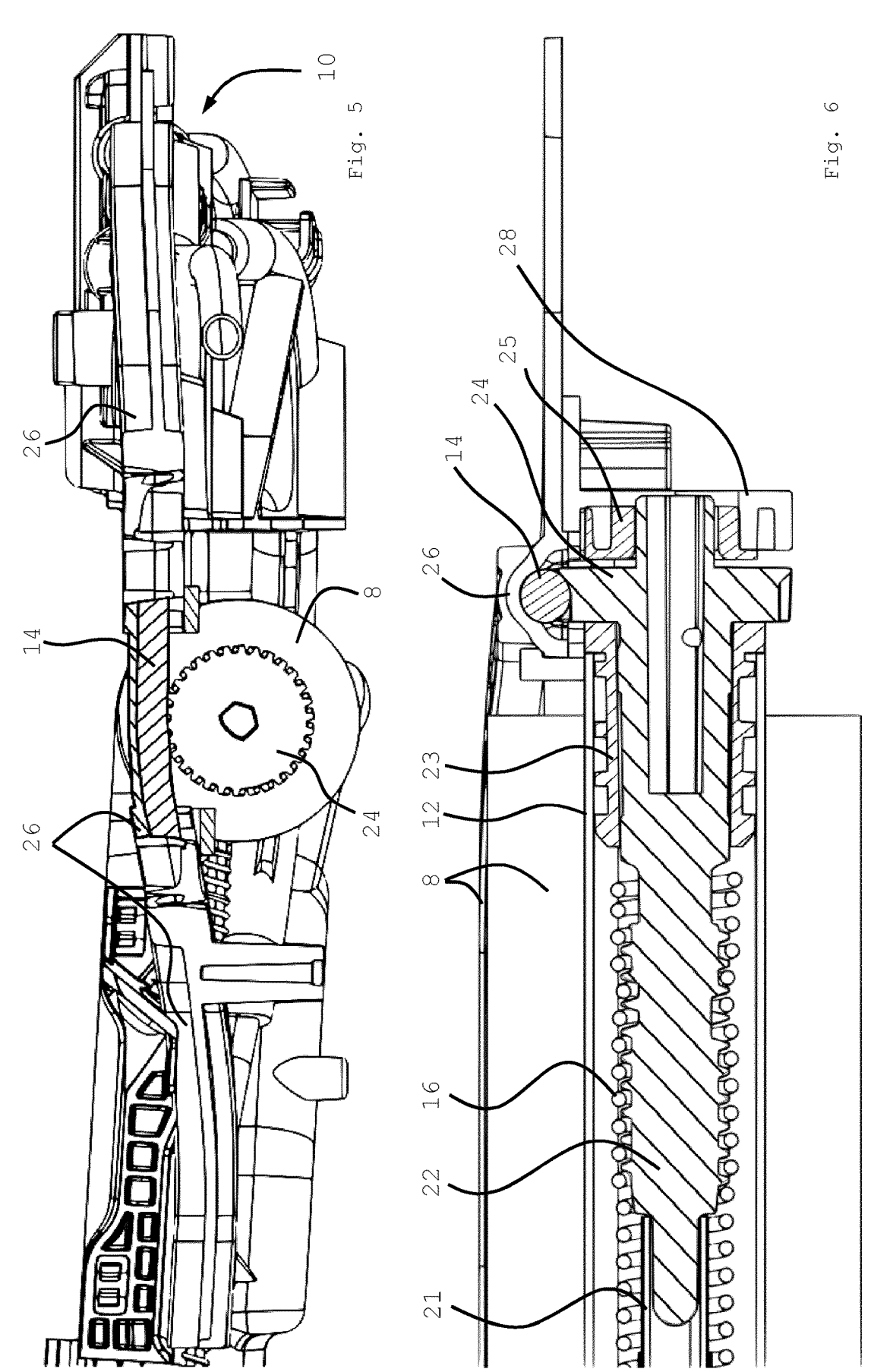
FIGS. 5 and 6 are sectional views according to the lines V-V, VI-VI, respectively, in FIG. 3 shown in the correct, not upside down, position.

FIG. 6 shows the opposite end of winding roller 12 in this first embodiment. It also shows the opposite end of a hollow winding shaft 21 supporting spring 16 from the inside and connecting fixator 17 to end piece 22 of winding shaft 21, such that they can relatively rotate. This end piece 22 of winding shaft 21 supports winding roller 12, but not in rotatably fixed manner, but in a rotatable manner by means of bearing sleeve 23. End piece 22 holds the other end of spring 16 in the same manner as fixator 17, so that this end of spring 16 cannot rotate with respect to end piece 22. End piece 22 also supports a gearwheel 24 which is either formed in one piece with end piece 22 or attached thereto by means of a spline or the like. Adjacent to gearwheel 24 on the outer side thereof is a bearing 25 in a plastic housing 28 on frame 10 to rotatably support this end of winding roller 12 and winding shaft 21, see also FIGS. 3 and 4.

Figure 3:
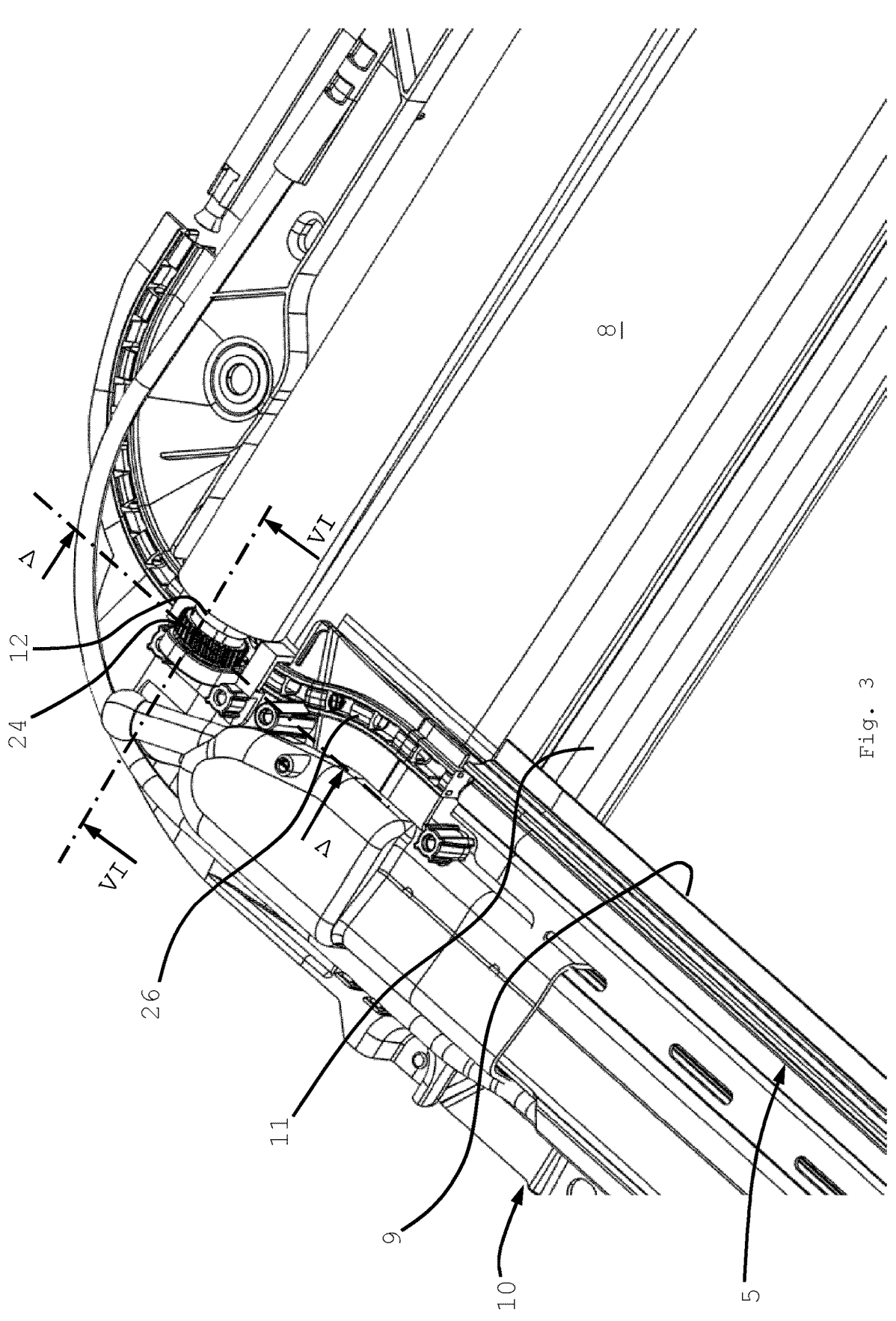
FIG. 3 shows detail III in FIG. 2 on a larger scale and with the frame upside down.

As is shown in FIGS. 3-5, gearwheel 24 is in engagement with an extension of one of drive cables 14. This drive cable 14 is guided in guide rail 5 and in this embodiment folding guide 15 is provided with an insert cable channel 26 acting as cable guide to guide drive cable 14 from the end of guide rail 5 slightly outwardly and upwardly to the circumference of gearwheel 24 such that teeth of gearwheel 24 are in engagement with the toothing on the outer side of drive cable 14. A longitudinal sliding displacement of drive cable 14 results in a rotation of gearwheel 24 and consequently in a rotation of winding shaft 21. Drive cable 14 is guided further in cable channel 26 now inserted in frame 10 to a cable guide tube 27 attached to frame 10 and extending substantially in transverse direction of the roof assembly.

The operation of the sunshade assembly is as follows:

When the sunscreen 8 is in its open position wound on winding roller 12 spring 16 is already loaded, i.e. twisted between fixator 17 of winding roller 12 and end piece 22 of winding shaft 21. Sunscreen 8 is thus already tensioned in longitudinal direction as winding shaft 21 is held by drive cable 14 and spring 16 is connected to stationary end piece 22 of winding shaft 21 and loads fixator 17 of winding roller in winding direction. If electric motor 13 is actuated it will move both drive cables 14, at the position of operating beam 11 of sunscreen in a direction away from winding roller 12 (in this case forward) so that sunscreen 8 will be unwound from winding roller 12 by operating beam 11. As a result, winding roller 12 will be set into rotation by sunscreen 8 and the rotational speed will depend on the speed of operating beam 11, but will also depend on the amount of sunscreen 8 on winding roller. That is, during unwinding the diameter of the wound sunscreen on the winding roller will decrease and if the unwinding speed of sunscreen 8 remains constant, the rotational speed of winding roller 12 will increase due to the decreasing unwinding diameter (more rotations are needed to unwind the same length of sunscreen).

When drive cables 14 move to unwind sunscreen 8, one of the drive cables 14 will rotate gearwheel 24 in the same rotational direction as winding roller 12 rotates. However, the rotational speed of winding shaft 21 will remain constant as long as drive cable 14 moves with a constant speed. This means that there will be a difference in rotational speed between winding shaft 21 and winding roller 12, which depends on the diameters of gearwheel 24 and winding roller 12 and the thickness of sunscreen 8. If the latter two are dictated by the design, the diameter of gearwheel 24 can be chosen so as to obtain the best characteristic, especially in view of the spring force. That is, if a speed difference exists between winding roller 12 and winding shaft 21, spring 16 will be further loaded or unloaded because the ends of spring 16 will be relatively rotated and thus spring 16 will be twisted. If the diameter of gearwheel 24 is chosen relatively small, then spring 16 might first be unloaded until the rotational speed of winding roller 12 catches up with winding shaft 21 and spring 16 will be loaded again. Preferably the diameter of gearwheel 24 will be such that spring 16 will be loaded in a slightly increasing manner during the whole unwinding movement. The return force needed to wind sunscreen 8 in the fully unwound position is higher anyhow than in an almost fully wound position. However, due to the winding shaft 21 rotating along with the winding roller 12 the spring force increase is limited and thus the load on the electric motor 13 and the resulting increase in motor noise is limited as well.

Due to the rotating winding shaft 21, spring 16 can be made with a smaller overall diameter, smaller wire diameter and a shorter length, enabling a reduction of the size of the winding roller. Because only one gearwheel is used the additional cost can be kept to a minimum while it has turned out that one gearwheel works as good as two gearwheels.

Figures 8, 9:
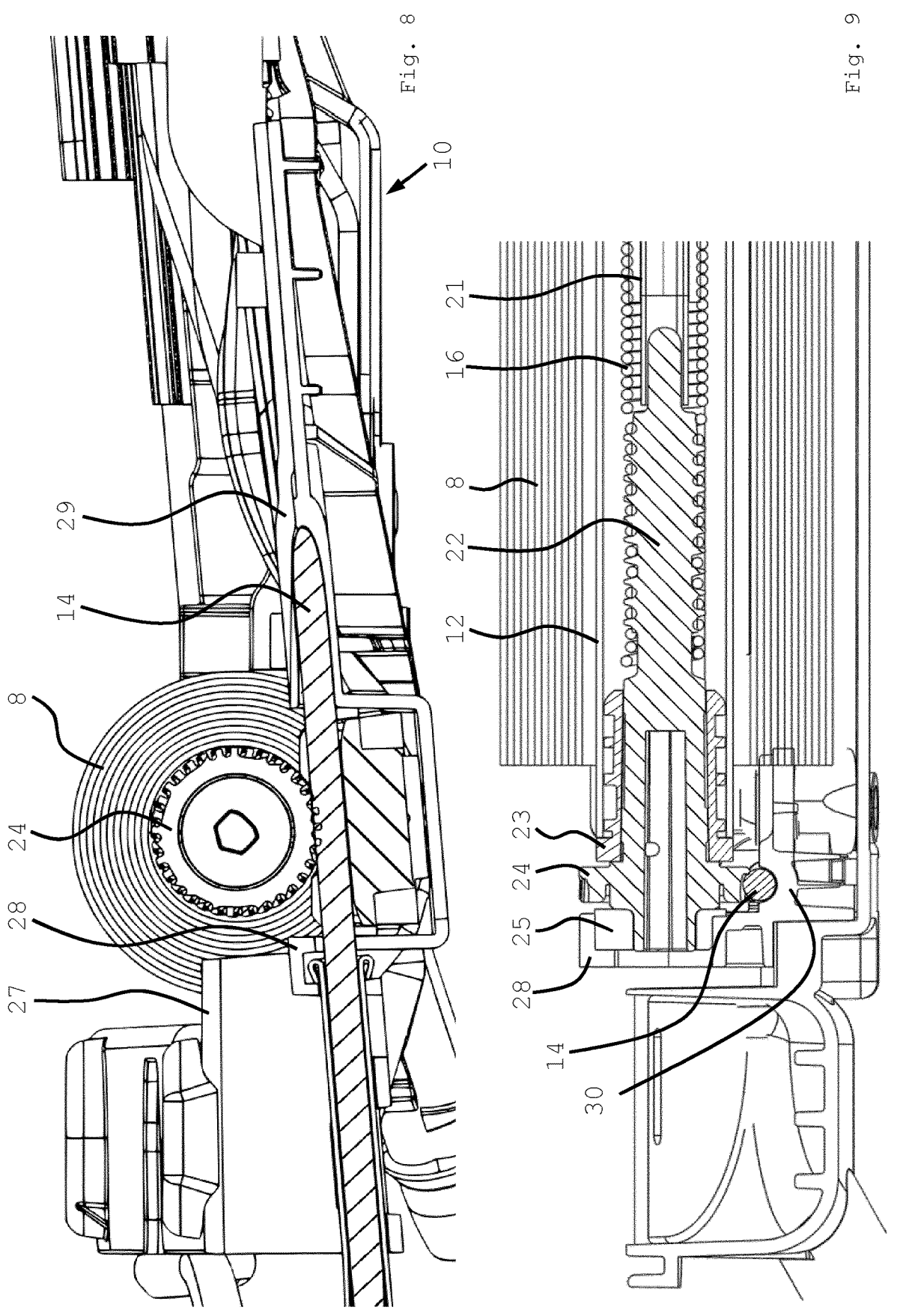
FIGS. 8 and 9 are sectional views according to the lines VIII-VIII, IX-IX, respectively, in FIG. 7.
Figure 10:
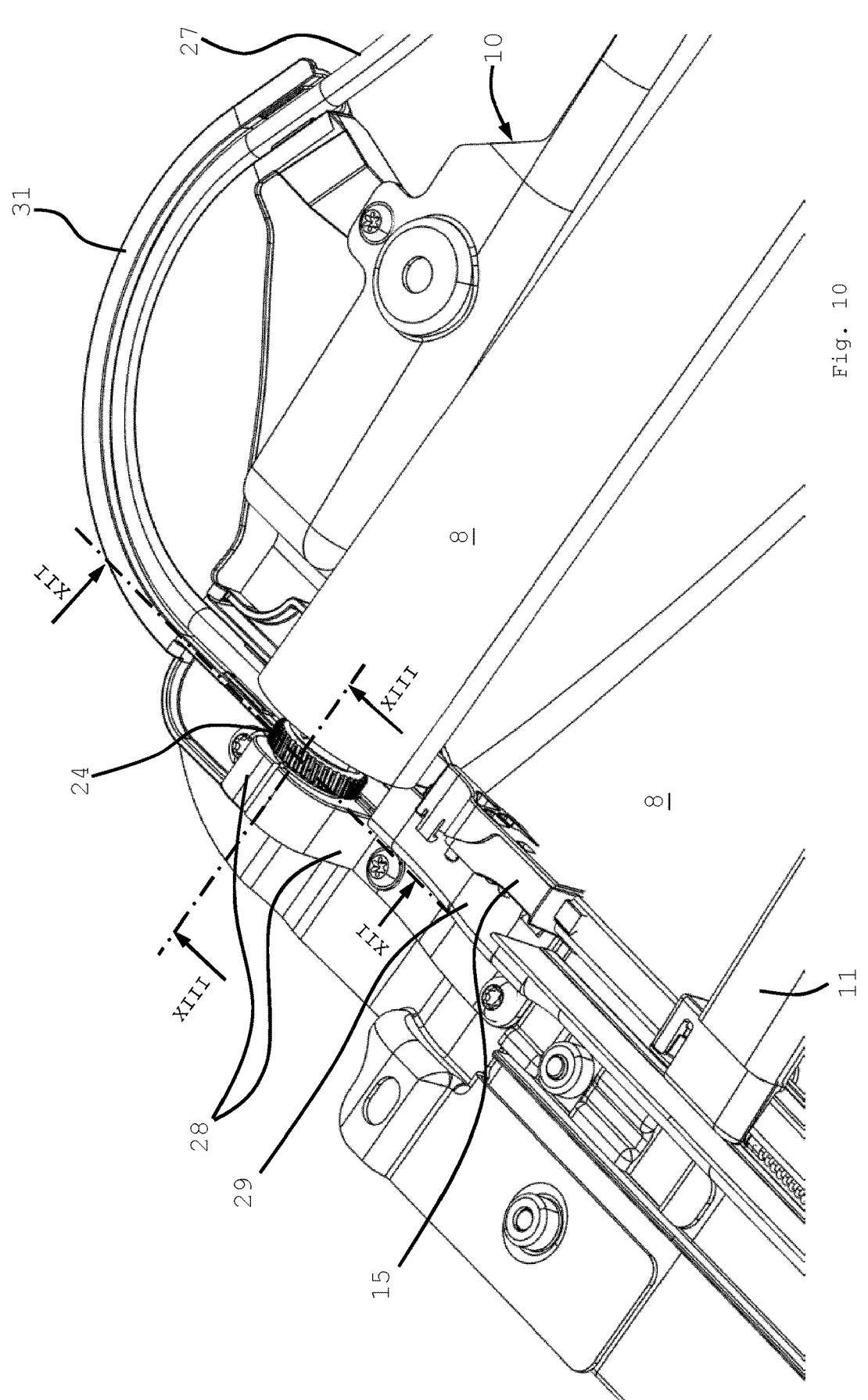
FIG. 10 is a view corresponding to that of FIG. 3 but showing still another embodiment.

FIGS. 7, 8 and 9 show a second embodiment of the sunshade assembly differing in the structure of the cable guide around gearwheel 24. First of all, FIG. 7 differs from FIG. 3 in that frame is now shown in its normal position. Thus sunscreen 8 is unwound from the lower side of winding roller 12 and gearwheel 24 is driven by drive cable 14 on its lower side as well, contrary to the embodiment of FIG. 3 where both takes place on the upper side. A closed cable guide 29, partly integrated with bearing housing 28, guides drive cable 14 towards the circumference of gearwheel 24 where cable guide 29 ends and a separate support holds drive cable 14 in engagement with gearwheel 24. Cable guide tube 27 is now extended up to the vicinity of gearwheel 24.

Figure 11:
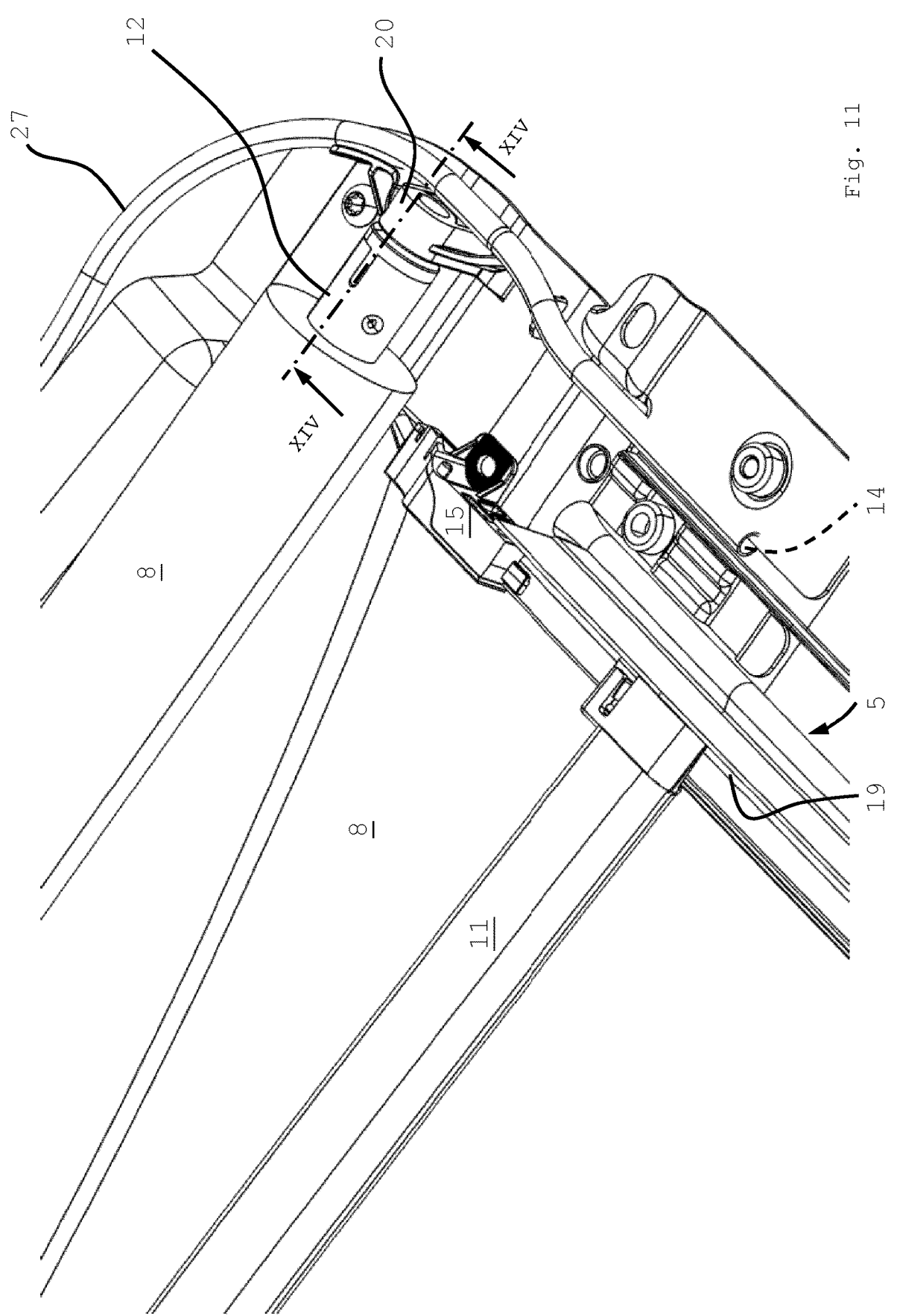
FIG. 11 is a view corresponding to that of FIG. 10 but showing the opposite end of the winding roller and shaft.
Figures 12, 13:
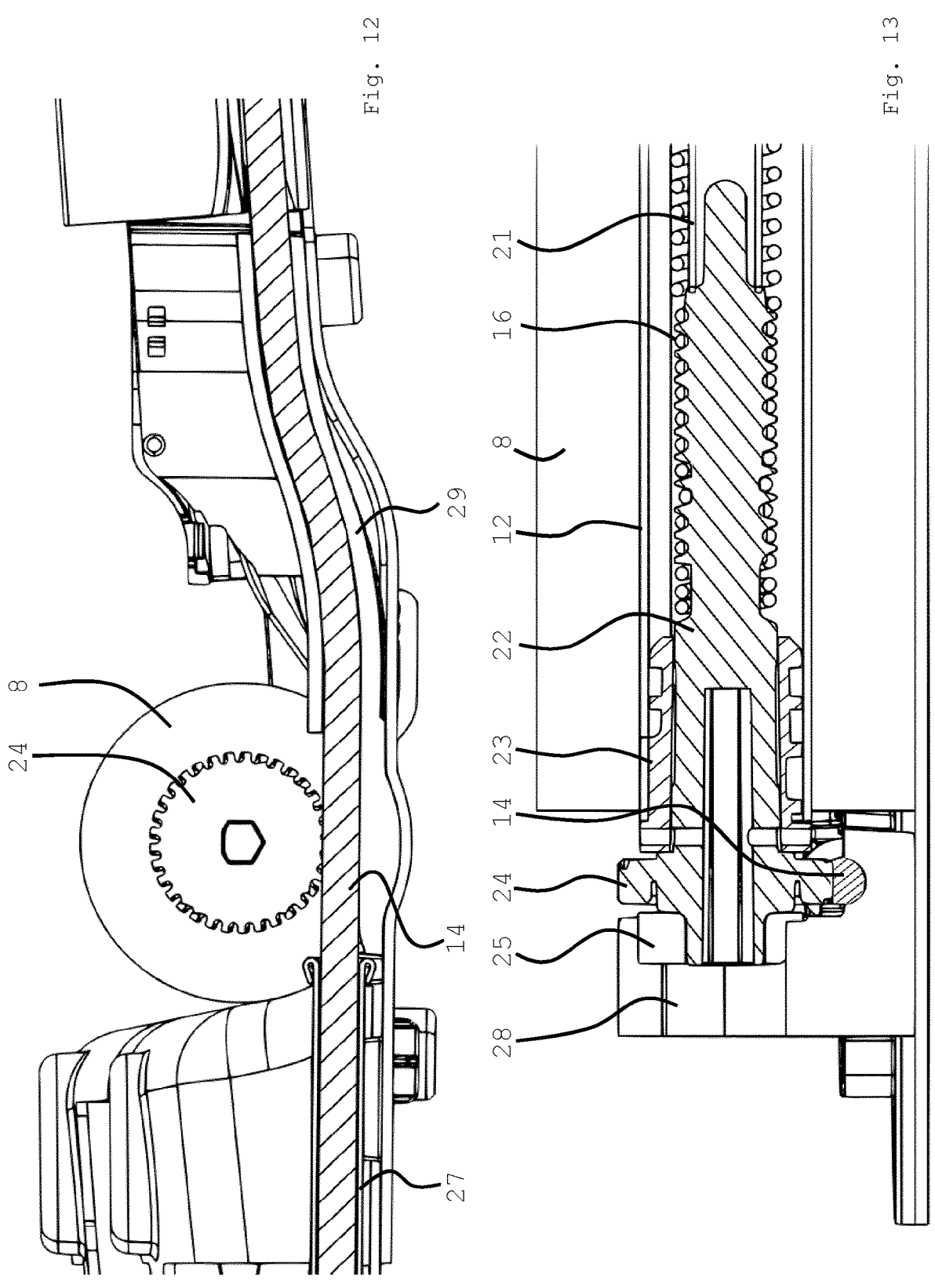
FIGS. 12 and 13 are sectional views according to the lines XII-XII, XIII-XIII, respectively, in FIG. 10.

The embodiment of FIGS. 10-14 is comparable to that of FIGS. 7-9. Cable guide 29 is now combined with bearing housing 28 which is formed in two parts. Cable guide tube 27 is supported by a cable support 31 of frame 10. FIGS. 11 and 14 show how drive cable 14 on the opposite end of winding roller 12 is guided within cable guide tube 27 around bearing 20 on that end of winding roller 12.

Detailed embodiments of the present invention are disclosed herein; however, it is to be understood that the disclosed embodiments are merely exemplary of the invention, which can be embodied in various forms within the scope of the claims. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

The invention claimed is:

1. A roof system for a vehicle including a sunshade assembly, which comprises:
   a flexible sunscreen having opposed longitudinal edges and opposed transversal edges;
   a winding shaft carrying a rotatable winding roller configured for winding and unwinding the sunscreen at a first one of its transversal edges, the winding roller being provided with an internal spring connected between the winding roller and the winding shaft and being preloaded to wind the sunscreen thereon;
   an operating beam connected to a second one of the transversal edges of the sunscreen;
   two drive parts extending along and capable of a movement parallel to the longitudinal edges of the sunscreen, wherein the drive parts are driven by a corresponding drive and are connected to opposite ends of the operating beam for moving the operating beam it to wind and unwind the sunscreen; and a rotatable drive member positioned at only one end of and concentrically fixed to the winding shaft and being drivably in engagement with one of the drive parts, such that a displacement of said one of the drive parts results in a rotation of the winding shaft in a same direction as the winding roller.

2. The roof system according to claim 1, wherein the spring is a torsion spring provided around the winding shaft and fixed with one end to the winding shaft and with the opposite end to the winding roller.

3. The roof system according to claim 2, wherein a spring fixator is clamped within the winding roller and is fixed to said opposite end of the torsion spring.

4. The roof system according to claim 1, wherein the drive parts are flexible drive cables having an outer toothing and the drive member being a gearwheel which engages with the toothing on said one of the drive cables.

5. The roof system according to claim 1, wherein the drive member is fixed to an end piece of the winding shaft which is rotatably accommodated within the winding roller.

6. The roof system according to claim 1, wherein the drive member is arranged next to a bearing to rotatably preces support the winding shaft.

7. The roof system according to claim 1, wherein the opposed longitudinal edges of the sunscreen are foldable and configured as longitudinal strips, the sunshade assembly further comprising longitudinal guide rails alongside the longitudinal edges of the sunscreen and configured to guide the ends of the operating beam and configured to slidably hold the longitudinal strips at the longitudinal edges of the sunscreen, which edges are unfolded when the sunscreen is wound up on the winding roller and which are folded into the longitudinal guide rails when the sunscreen in unwound from the winding roller.

8. The roof system according to claim 7, wherein the longitudinal guide rails are provided with a folding guide for folding and unfolding the longitudinal strips, wherein the drive parts are flexible drive cables having an outer toothing and the drive member being a gearwheel which engages with the toothing on said one of the drive cables, and wherein said one of the drive cables is guided in a cable guide to said gearwheel, said cable guide being connected to or integrated into the folding guide.

9. The roof system according to claim 8, wherein the cable guide extends from the corresponding longitudinal guide rail outwardly to a position engaging the gearwheel.

10. The roof system according to claim 9, wherein the cable guide extends from a position engaging the gearwheel longitudinally and then inwardly along a curve.

11. The roof system according to claim 4, comprising a frame to support the sunshade assembly, wherein said one of the drive cables is guided in a cable guide, and wherein the cable guide is at least partly a tube fixed to the frame.

12. The roof system according to claim 4, comprising a frame to support the sunshade assembly, wherein said one of the drive cables is guided in a cable guide, and wherein the cable guide is at least partly a cable guide channel integrated in or connected to the frame which is made at least partly from plastic.

13. The sunshade assembly apparently intended and suited for use in a roof system for a vehicle according to claim 1.

* * * * *